(12) United States Patent
Zhang et al.

(10) Patent No.: US 9,684,672 B2
(45) Date of Patent: Jun. 20, 2017

(54) SYSTEM AND METHOD FOR DATA STORAGE

(71) Applicant: EMPIRE TECHNOLOGY DEVELOPMENT LLC, Wilmington, DE (US)

(72) Inventors: Lei Zhang, Beijing (CN); Xuefeng Song, Shijiazhuang (CN); Qi Li, Beijing (CN)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 275 days.

(21) Appl. No.: 14/358,770

(22) PCT Filed: Jul. 1, 2013

(86) PCT No.: PCT/CN2013/078573
§ 371 (c)(1),
(2) Date: May 16, 2014

(87) PCT Pub. No.: WO2015/000103
PCT Pub. Date: Jan. 8, 2015

(65) Prior Publication Data
US 2015/0293937 A1 Oct. 15, 2015

(51) Int. Cl.
*G06F 17/30* (2006.01)
*H04L 29/06* (2006.01)
*G06F 12/0802* (2016.01)

(52) U.S. Cl.
CPC .... *G06F 17/30197* (2013.01); *G06F 12/0802* (2013.01); *G06F 17/30581* (2013.01); *G06F 17/30961* (2013.01); *H04L 67/42* (2013.01)

(58) Field of Classification Search
CPC ........... G06F 12/0862; G06F 17/30581; G06F 17/30197; G06F 17/30961
(Continued)

(56) References Cited

U.S. PATENT DOCUMENTS 6,883,029 B2 * 4/2005 Karamanolis ..... G06F 17/30067
707/999.008
8,635,402 B2 * 1/2014 Torii ................. G06F 17/30982
707/747

(Continued)

FOREIGN PATENT DOCUMENTS

CN 101505298 A 8/2009
CN 101751415 A 6/2010

OTHER PUBLICATIONS

International Search Report and Written Opinion dated Apr. 3, 2014 in application No. PCT/CN2013/078573.
(Continued)

*Primary Examiner* — Phong Nguyen
(74) *Attorney, Agent, or Firm* — Maschoff Brennan (57) ABSTRACT

In some examples, a system configured to provide data storage is described. The system may include a write server configured to receive data from a first client for storing on the system and computer storage media configured to receive and to store the data. The system may also include a read server configured to receive the data from the write server and to store the data in the read server for a duration. The read server may be further configured to provide the data from the read server to a second client during the duration and, after the duration, to access the data from the computer storage media and to provide the data accessed from the computer storage media to the second client.

24 Claims, 6 Drawing Sheets

(58) Field of Classification Search
USPC .................................................. 707/741, 797
See application file for complete search history.

(56) References Cited

U.S. PATENT DOCUMENTS

| | | | |
|---|---|---|---|
| 2002/0112023 A1* | 8/2002 | Karamanolis | G06F 17/30067 709/217 |
| 2007/0022148 A1* | 1/2007 | Akers | G06F 17/30138 707/E17.01 |
| 2010/0036952 A1* | 2/2010 | Hazlewood | G06F 15/173 709/226 |
| 2010/0205181 A1* | 8/2010 | Chidlovskii | G06F 17/30241 707/741 |
| 2011/0145532 A1* | 6/2011 | Deguchi | G06F 3/0613 711/165 |
| 2011/0276744 A1 | 11/2011 | Sengupta et al. | |
| 2012/0036317 A1* | 2/2012 | Torii | G06F 17/30982 711/108 |

OTHER PUBLICATIONS

Borthakur, D., et al., "Apache Hadoop Goes Realtime at Facebook," Proceedings of the 2011 ACM SIGMOD International Conference on Management of data, pp. 1071-1080 (2011).

Debnat, B., et al., "SkimpyStash: RAM Space Skimpy Key-Value Store on Flash-based Storage," Proceedings of the 2011 ACM SIGMOD International Conference on Management of data, pp. 25-36 (2011).

Gámez, J.G., "In-memory and On-disk hybrid relational database management system," Master Thesis, DAMA-UPC, Departament d'Arquitectura de Computadors Universitat Politècnica de Catalunya, pp. 83 (2011).

International Search Report and Written Opinion dated Jul. 1, 2013 as received in Application No. PCT-CN2013-078573 (1).

\* cited by examiner

SYSTEM AND METHOD FOR DATA STORAGE

CROSS-REFERENCE TO RELATED APPLICATION

This application is a U.S. National Stage filing under 35 U.S.C. §371 of International Application No. PCT/CN2013/078573, filed on Jul. 1, 2013. The PCT Application is herein incorporated by reference in its entirety.

BACKGROUND

Unless otherwise indicated herein, the materials described herein are not prior art to the claims in the present application and are not admitted to be prior art by inclusion in this section.

An amount of data being processed for various reasons continues to increase. For example, social media sites, such as Facebook, may process large amounts of data continuously. As data is processed, large amounts of the data may be cached. In some circumstances, the data may be cached on a storage system that is coupled to a unit processing the data through a network using a client-server relationship. Some existing configurations currently used for caching large amount of data, for data processing and/or for other operation, may not be optimal and may have various flaws.

For example, in some storage systems, the storage systems may rely only on internal memory and are not designed to cache a part of the data on an external disk or computer storage media. As another example, in some storage systems, a single server may handle both read and write requests from clients, which may congest the single server.

SUMMARY

Techniques described herein generally relate to data storage in a client-server relationship.

In some examples, a system configured to provide data storage is described. The system may include a write server configured to receive data from a first client for storing on the system and computer storage media configured to receive and to store the data. The system may also include a read server configured to receive the data from the write server and to store the data in the read server for a duration. The read server may be further configured to provide the data from the read server to a second client during the duration and, after the duration, to access the data from the computer storage media and to provide the data accessed from the computer storage media to the second client.

In some examples, a method of providing data storage is described. The method may include receiving a write data request for data from a first client at a first server, transferring the data to a second server, and storing the data in the second server. The method may further include storing the data in non-volatile computer storage media and receiving a read data request for the data from a second client at the second server. During a duration after storing the data at the second server, the method may include accessing the data in the second server and providing the data from the second server to the second client. After the duration, the method may include accessing the data in the non-volatile computer storage media and providing the data from the non-volatile computer storage media to the second client.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawings, which form a part hereof In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

In some embodiments, a system may be configured to receive write data requests and read data requests from clients over a network. The system may include one or more write servers, which are configured to handle write data requests, that are separate from one or more read servers, which are configured to handle read data requests. For example, a client may send a write data request to the write server. The write server may be configured to handle the write data request and to receive the data from the client. The write server may then transfer the data to one of the read servers. When the client sends a read data request, the read server may be configured to receive the read data request and to provide the data to the client. In some embodiments, the read server may provide the data from data storage internal to the read server. In some embodiments, the read server may provide the data from a computer storage media separate from the read server. In these and other embodiments, the read server or the write server may have written the data to the computer storage media. By configuring the system with separate write and read servers, the write and read servers may be optimized for their particular functions. Alternately or additionally, by separating the write and read servers, the system may provide faster responses to read and/or write requests than if the write and read servers were not separated. In addition to providing separate read and write servers, in some embodiments, the system may be configured to optimize read times by using bloom filters and a B+ tree indexing method within the computer storage media. Alternately or additionally, the system may be configured to be accessed using key-value pairs and hash algorithms.

Figure 1:
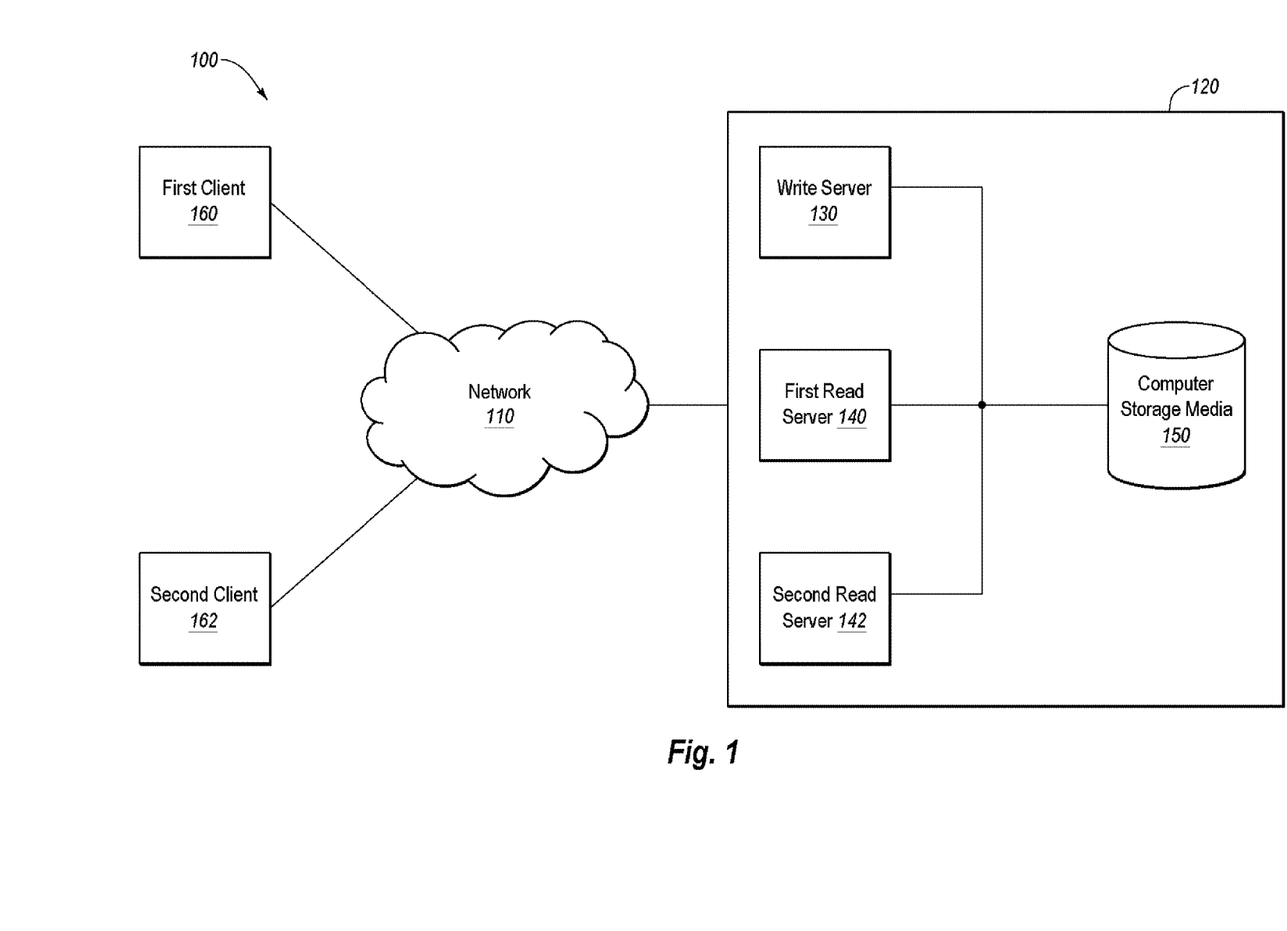
FIG. 1 is a block diagram of an example operating environment that includes a data storage system.

FIG. 1 is a block diagram of an example operating environment 100 that includes a data storage system 120, arranged in accordance with at least some embodiments described herein. In the illustrated embodiment, the operating environment 100 may include a network 110; the data storage system 120; a first client 160, and a second client 162. In other embodiments, the operating environment 100 may include fewer or more clients and/or data storage systems than the illustrated first and second clients 160 and 162 and the data storage system 120. For example, the operating environment 100 may include 5, 10, 20, 50, or more clients. Alternately or additionally, the operating environment 100 may include 5, 10, 20, 50 or more data storage systems 120. Alternately or additionally, the data storage system 120 and/or other data storage systems within the operating environment 100 may include more write servers and/or more read servers than illustrated in FIG. 1.

In general, the network 110 may include one or more wide area networks (WANs) and/or local area networks (LANs) that enable the first and second clients 160 and 162 and the data storage system 120 to communicate. In some embodiments, the network 110 may include the Internet, including a global internetwork formed by logical and physical connections between multiple WANs and/or LANs. Alternately or additionally, the network 110 may include one or more cellular RF networks and/or one or more wired and/or wireless networks such as, but not limited to, 802.xx networks, Bluetooth access points, wireless access points, IP-based networks, or the like. The network 110 may also include servers that enable one type of network to interface with another type of network.

The data storage system 120 may be configured to include a write server 130, a first read server 140, a second read server 142, and a computer storage media 150. The write server 130 and the first and second read servers 140, 142 may each be configured to communicate with the first and second clients 160, 162 through the network 110. The write server 130 and the first and second read servers 140, 142 may also each be configured to communicate with each other and with the computer storage media 150. In particular, the write server 130 and the first and second read servers 140, 142 may each be configured to write data to the computer storage media 150 and the first and second read servers 140, 142 may each be configured to read data from the computer storage media 150.

The write server 130 and the first and second read servers 140, 142, may be any type of processing units configured to operate as servers and to provide the functionality described herein. In some embodiments, the write server 130 and the first and second read servers 140, 142 may have the same type of hardware or different types of hardware. For example, in some embodiments, the first and second read servers 140, 142 may have more local data storage than the write server 130. Alternately or additionally, the first and second read servers 140, 142 and the write server 130 may have the same amount of local data storage. Thus, in some embodiments, the designation as a write server or a read server may be determined based on operations that a server performs within the data storage system 120 rather than hardware included within the server. The computer storage media 150 may be any type of non-volatile computer storage media that is separate from the write server 130 and the read servers 140, 142. For example, the computer storage media 150 may be a hard disk drive (HDD), a solid state drive (SSD), an optical disc, a magnetic tape, a holographic memory, among other types of computer storage media. In some embodiments, the computer storage media 150 may be indexed using methods such as a B+ tree, a B tree, a tango tree, a splay tree, a treap, a red-black tree, a UB tree, an Htree, a dancing tree, or some other method to decrease data access times as compared to memories having other types of indexing.

In general, the data storage system 120 may be configured to store data for a client, such as the first and/or second client 160, 162, and to provide data stored in the data storage system 120 to the client.

To store data for a client, the data storage system 120 may be configured to receive a write data request from the client. The write data request may be directed to or mapped to the write server 130. The write server 130 may be configured to receive the write data request and to establish a communication connection between the write server 130 and the client through the network 110. The write server 130 may use any known type of protocol to establish the communication connection between the write server 130 and the client. After establishing the communication connection, the write server 130 may be configured to receive data from the client, as indicated in the write data request, that is to be stored by the data storage system 120. The data may be any type of data from the client and may be one or more files of a certain file type, multiple files each of different data types, or multiple groups of multiple files where each group has a different data type.

The write server 130 may be configured to write the data to one of the first or second read servers 140, 142. The write server 130 may select between the first or second read servers 140, 142 based on the received write data request, a type of the data, information within the data, an availability of the first and second read servers, a used storage capacity of the first and second read servers, or on some other criteria. The read server selected by the write server 130 to receive the data may be referred to herein as the selected read server.

In some embodiments, the write server 130 may also be configured to write the data to the computer storage media 150 after receiving the data. The write server 130 may write the data to the computer storage media 150 based on the write data request, on the type of the data, or on some other criteria. When the write server 130 writes the data to the computer storage media 150, the write server 130 may indicate to the selected read server that the data is written and stored in the computer storage media 150 and may provide the storage location of the data in the computer storage media 150 to the selected read server.

The selected read server may store the data in internal data storage of the selected read server for a duration. The duration for which the data is stored within the data storage of the selected read server may be based on one or more factors including data storage space within the selected read server, a last access time of the data by the selected read server based on read data requests received at the selected read server, a number of the read data requests received at the selected read server over a period, among other factors.

After the duration, the selected read server may delete the data from the data storage of the selected read server. Deleting the data from the data storage may include wiping clean the data storage area of the selected read server that contained the data and/or removing pointers or other indicators from systems maintaining the allocation of memory in the data storage to indicate that the storage space that stored the data is available.

When the write server 130 had not previously stored the data in the computer storage media 150, the selected read server may be configured to store the data in the computer storage media 150 before deleting the data from the data storage of the selected read server.

To provide data stored in the data storage system 120 to a client, the data storage system 120 may be configured to receive a read data request from the client for the data. The read data request may be directed to or mapped to the selected read server. The selected read server may be configured to receive the read data request and to establish a communication connection between the selected read server and the client through the network 110. The selected read server may use any known type of protocol to establish the communication connection between the selected read server and the client.

When the data is stored in the data storage of the selected read server when the read data request is received, the selected read server may provide the data from the data storage to the client. When the data has been deleted from the data storage of the selected read server when the read data request is received, the selected read server may access the computer storage media 150 to obtain the data and provide the data accessed from the computer storage media 150 to the client.

In some embodiments, when the data has been deleted from the data storage of the selected read server, the selected read server may include one or more mechanisms for recording data that have been deleted from the selected read server. For example, in some embodiments, the selected read server may include a bloom filter that may be used to determine if data was previously stored in the selected read server and currently stored in the computer storage media 150. In these and other embodiments, after receiving a data read request for data and determining that the data is not in data storage of the selected read server, the selected read server may use the bloom filter to determine if the data is stored on the computer storage media 150. When the bloom filter indicates that the data is not stored on the computer storage media 150, the selected read server may indicate to a client that issued the data read request that the data is not found. When the bloom filter indicates that the data is stored on the computer storage media 150, the selected read server may retrieve the data from the computer storage media 150 and may send the data retrieved from the computer storage media 150 to the client.

The configuration of the data storage system 120 as described herein thus provides separate read and write mechanisms, namely a write server dedicated to receiving and handling write data requests from clients and a read server dedicated to receiving and handling read data requests from the clients for data previously written to the data storage system 120. By providing separate read and write servers, each of the read and write servers may be optimized and may provide better service to a client than a server that operates to handle both write and read data requests from a client.

In some embodiments, the data may be a key-value pair, otherwise known as a name-value pair, a field-value pair, or an attribute-value pair. In these and other embodiments, the write data requests and the read data requests may be a key-value pair or may include other information along with a key-value pair. A key of a key-value pair may be used by the first and second clients 160, 162 to determine a write server to send write data requests. Alternately or additionally, a key of a key-value pair may be used by the first and second clients 160, 162 to determine a read server to send read data requests. Alternately or additionally, a key of a key-value pair may be used by the write server 130 to select one of the read servers 140, 142 for sending the key-value pair after receiving the key-value pair from a client. Alternately or additionally, a key of a key-value pair may be used by a selected read server for determining if the key-value pair is stored in the selected read server or the computer storage media 150. In these and other embodiments, the first and second clients 160, 162, the write server 130, and the first and second read servers 140, 142 may use one or more hash algorithms to determine information, such as a write server to write to, based on a key of a key-value pair.

The first and second clients 160, 162 may be any system, application, or device that may be configured to access the data storage system 120. The first and second clients 160, 162 may be configured to generate and send write data requests and read data requests through the network 110 to the data storage system 120. Furthermore, the first and second clients 160, 162 may be configured to communicate with the data storage system 120 as described herein to send data to the data storage system 120 for storing in the data storage system 120 and to receive data previously stored in the data storage system 120.

Modifications, additions, or omissions may be made to FIG. 1 without departing from the scope of the present disclosure. For example, additional data storage systems may be added to the operating environment 100. Alternately or additionally, additional clients may be added to the operating environment 100 that access the data storage system 120. Alternately or additionally, the operating environment 100 may not include the network 110.

Figure 2:
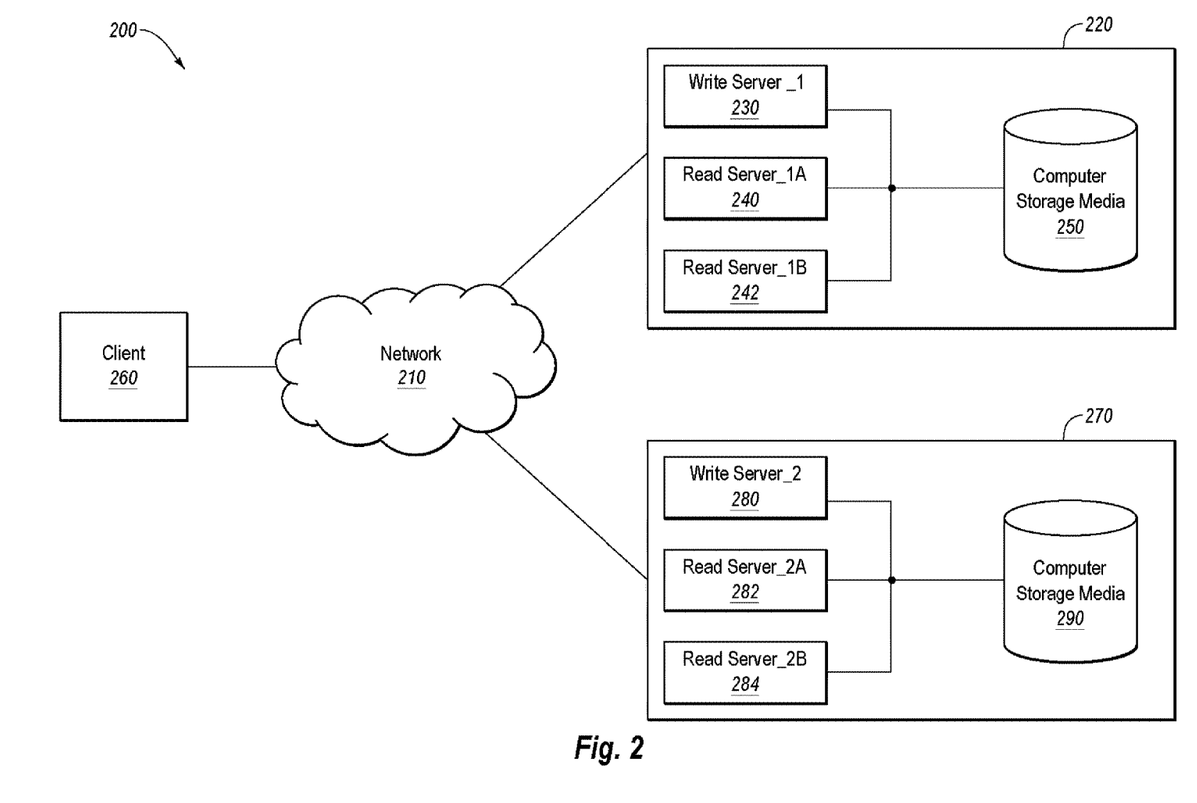
FIG. 2 is a block diagram of an example operating environment that includes first and second data storage systems.

FIG. 2 is a block diagram of an example operating environment 200 that includes first and second data storage systems 220, 270, arranged in accordance with at least some embodiments described herein. In the illustrated embodiment, the operating environment 200 may include a network 210, the first data storage system 220, a client 260 and the second data storage system 270. In other embodiments, the operating environment 100 may include fewer or more clients 260 and/or data storage systems 220, 270.

The network 210 may be similar to the network 110 of FIG. 1 and no further description is provided herein of the network 210. The data storage system 220 may be configured to include write server_1 230, read server_1A 240, read server_1B 242, and computer storage media 250. In general, the data storage system 220 may be configured to store data for the client 260 and to provide data stored in the data storage system 220 to the client 260 and may operate similar to the data storage system 120 of FIG. 1. The data storage system 270 may be configured to include write server_2 280, read server_2A 282, read server_2B 284, and computer storage media 290. In general, the data storage system 270 may be configured to store data for the client 260 and to provide data stored in the data storage system 270 to the client 260 and may operate similar to the data storage system 120 of FIG. 1.

In some embodiments, the data stored and provided by the data storage systems 220, 270 may be one or more key-value pairs. In general, a key in a key-value pair stored by the data storage systems 220, 270 may be used by the operating environment 200 to determine which of the data storage systems 220, 270 may handle the key-value pair. In particular, a hash algorithm, in a form of a hash table or in some other form, may be used with a key of a key-value pair to determine write and read servers that may handle the key-value pair within the operating environment 200. In some embodiments, a hash algorithm may be used with a key of a key-value pair to generate a hash value that may indicate a write server for which the key-value pair may be written, a read server that may provide the key-value pair after the key-value pair is previously written to one of the data storage systems 220, 270, and/or a storage location within a read server or a computer storage media for the key-value pair.

For example, a key of a key-value pair may have a value [0, 40]. A key with a value [0, 20) may generate a hash value that indicates that the key-value pair is to be written to the write server_1 230. Thus, a key with a value [0, 20) may be mapped to the write server_1 230. The keys that map to the write server_1 230 may also be used to map to the read server_1A 240 and the read server_1B 242. For example, a key with a value [0,10) may generate a hash value that indicates that the key-value pair is to be stored by the read server_1A 240. Thus, a key with a value [0, 10) may be mapped to the write server_1 230 and the read server_1A 240. A key with a value [10,20) may generate a hash value that indicates that the key-value pair is to be stored by the read server_1B 242. Thus, a key with a value [10, 20) may be mapped to the write server_1 230 and to the read server_1B 242.

Because the keys that map to the write server_1 230 may also be used to map to the read server_1A 240 and the read server_1B 242, the read server_1A 240 and the read server_1B 242 may be deemed to be slaves of the write server_1 230. When a read server is a slave of a write server, the read server only stores data written to the write server that is its master.

Continuing the above example, a key with a value [20, 40] may generate a hash value that indicates that the key-value pair is to be written to the write server_2 280. Thus, a key with a value [20, 40] may be mapped to the write server_2 280. The keys that map to the write server_2 280 may also be used to map to the read server_2A 282 and the read server_2B 284. For example, a key with a value [20,30) may generate a hash value that indicates that the key-value pair is to be stored by the read server_2A 282. Thus, a key with a value [20, 30) may be mapped to the write server_2 280 and the read server_2A 282. A key with a value [30, 40] may generate a hash value that indicates that the key-value pair is to be stored by the read server_2B 284. Thus, a key with a value [30, 40] may be mapped to the write server_2 280 and to the read server_2B 284. Because the keys that map to the write server_2 280 may also be used to map to the read server_2A 282 and the read server_2B 284, the read server_2A 282 and the read server_2B 284 may be deemed to be slaves of the write server_2 280.

A non-limiting example is now provided that illustrates how a key of a key-value pair may be used within the operating environment 200. A key of a key-value pair may have a value of 14. To determine where to write the key-value pair, the client 260 may use a hash algorithm to map the key to the write server_1 230. The client 260 may send a write data request that includes the key-value pair to the write server_1 230. The write server_1 230 may use the hash algorithm to map the key to the read server_1B 242. The write server_1 230 may send the key-value pair to the read server_1B 242. The read server_1B 242 may use the hash algorithm to map the key to a location in data storage within the read server_1B 242 where the key-value pair may be stored. Similarly, the write server_1 230 and/or the read server_1B 242 may use the hash algorithm to map the key to a location in the computer storage media 250 where the key-value pair may be stored.

To determine where to send a read data request, the client 260 may use the hash algorithm to map the key of the key-value pair to the read server_1B 242. The client 260 may send a data read request that includes the key to the read server_1B 242 requesting the value of the key-value pair. The read server_1B 242 may use the key of the key-value pair to determine a location for the key-value pair in either the data storage of the read server_1B 242 or the computer storage media 250. After determining the location, the read server_1B 242 may access the key-value pair and send the key-value pair to the client 260.

The above description of how a key-value pair may be used in the operating environment 200 is given by way of example and is not limiting. Permutations, modifications, additions, or omissions may be made to either the above description or the operational environment 200 without departing from the scope of the present disclosure.

Figure 3:
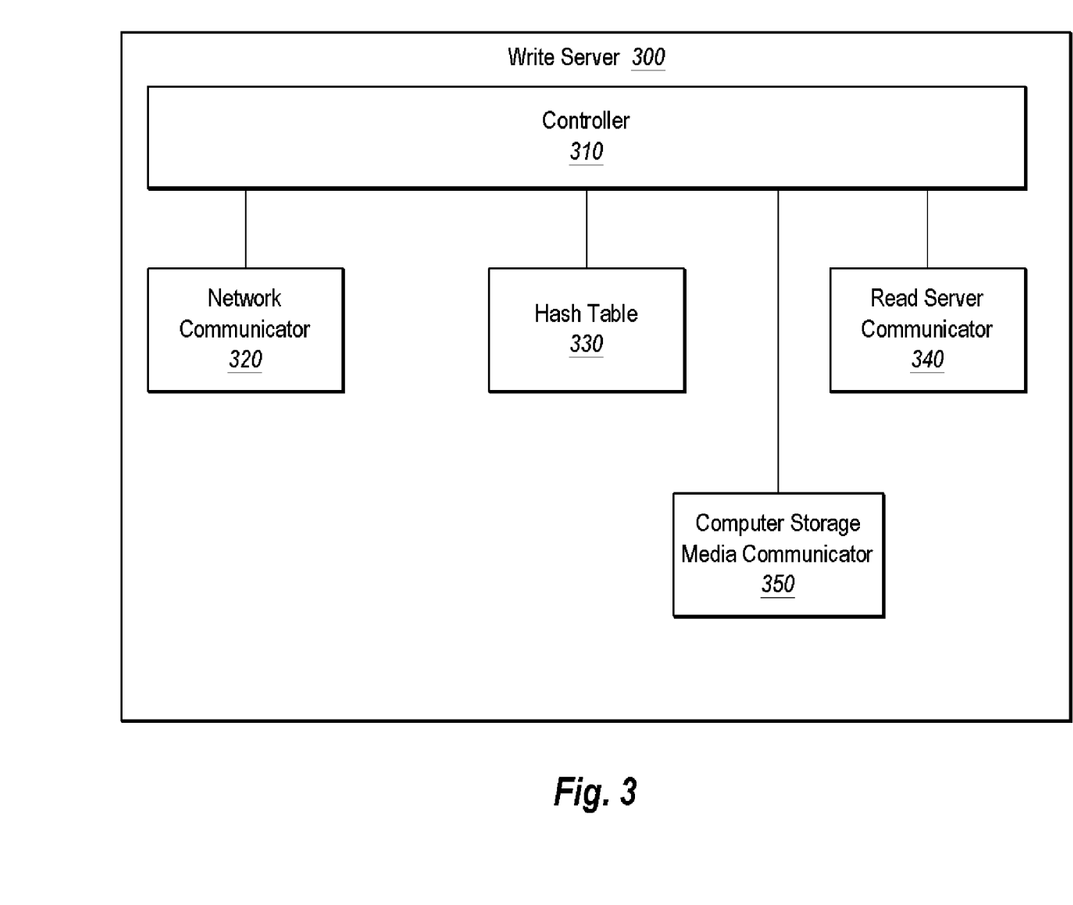
FIG. 3 is a block diagram of an example write server that may be implemented in any of the example data storage systems of FIGS. 1 and 2.

FIG. 3 is a block diagram of an example write server 300 that may be implemented in any of the example data storage systems 120, 220, 270 of FIGS. 1 and 2, arranged in accordance with at least some embodiments described herein.

As illustrated, the write server 300 may include a controller 310, a network communicator 320, a hash table 330, a read server communicator 340, and a computer storage media communicator 350. The controller 310 may be communicatively coupled with the network communicator 320, the hash table 330, the read server communicator 340, and the computer storage media communicator 350.

The write server 300 may be configured to use the controller 310, the network communicator 320, the hash table 330, the read server communicator 340, and the computer storage media communicator 350, to communicate with one or more clients and to receive and process write data requests from one or more clients.

In general, the controller 310 may be configured to control the operations of the write server 300 and to coordinate processing of write data requests with the network communicator 320, the hash table 330, the read server communicator 340, and the computer storage media communicator 350.

The network communicator 320 may be configured to receive write data requests from one or more clients. To receive a write data request, the network communicator 320 may receive a request for data transfer from a client and establish a communication connection between the network communicator 320 and the client. The write data request may then be transferred from the client to the network communicator 320. In some embodiments, the write data request may include data, such as a key-value pair, and/or other information about the client and/or the data. The network communicator 320 may indicate to the controller 310 that a write data request has been received.

The controller 310 may be configured to determine a read server where the data in the write data request is to be stored. In some embodiments, when the write data request includes a key-value pair, the controller 310 may send the key of the key-value pair to the hash table 330. The hash table 330 may be configured to determine a hash value using the key that may indicate a read server for storing the key-value pair and send the hash value to the controller 310. In some embodiments, the write data request may include information besides a key of a key-value pair that may indicate the read server where the data is to be stored.

The controller 310 may be configured to send the data and the information regarding the indicated read server where the data is to be stored to the read server communicator 340. The read server communicator 340 may be configured to establish a communication connection with the indicated read server and to send the data to the read server. In some embodiments, the read server communicator 340 may be configured to delay sending the data to the read server based on settings within the write server 300, such as a minimum data transfer amount or minimum wait time between transfers. For example, in some embodiments, the read server communicator 340 may delay sending data to the indicated read server until there is more than a predetermined amount of data to send to the indicated read server. In these and other embodiments, the data being sent to the read server may be from a compilation of multiple write data requests, a single write data request, or from a part of a write data request.

In some embodiments, the controller 310 may be further configured to store the data from the write data request in computer storage media separate from a read server and the write server 300. The controller 310 may determine when to store the data into the computer storage media based on a type of the data, an indication in the write data request, a client that issued the write data request, among other things. For example, the controller 310 may store the data in the computer storage media when the data is considered critical data. When the controller 310 determines to store the data from the write data request in the computer storage media, the controller 310 may send the data to the computer storage media communicator 350 and may indicate to the indicated read server that the data is being or will be stored in the computer storage media. By storing the data in the computer storage media, the data may be maintained if the read server that received the data deletes or inadvertently loses the data.

The computer storage media communicator 350 may be configured to establish a communication connection with the computer storage media and to handle the transfer and storage of the data to the computer storage media.

Figure 4:
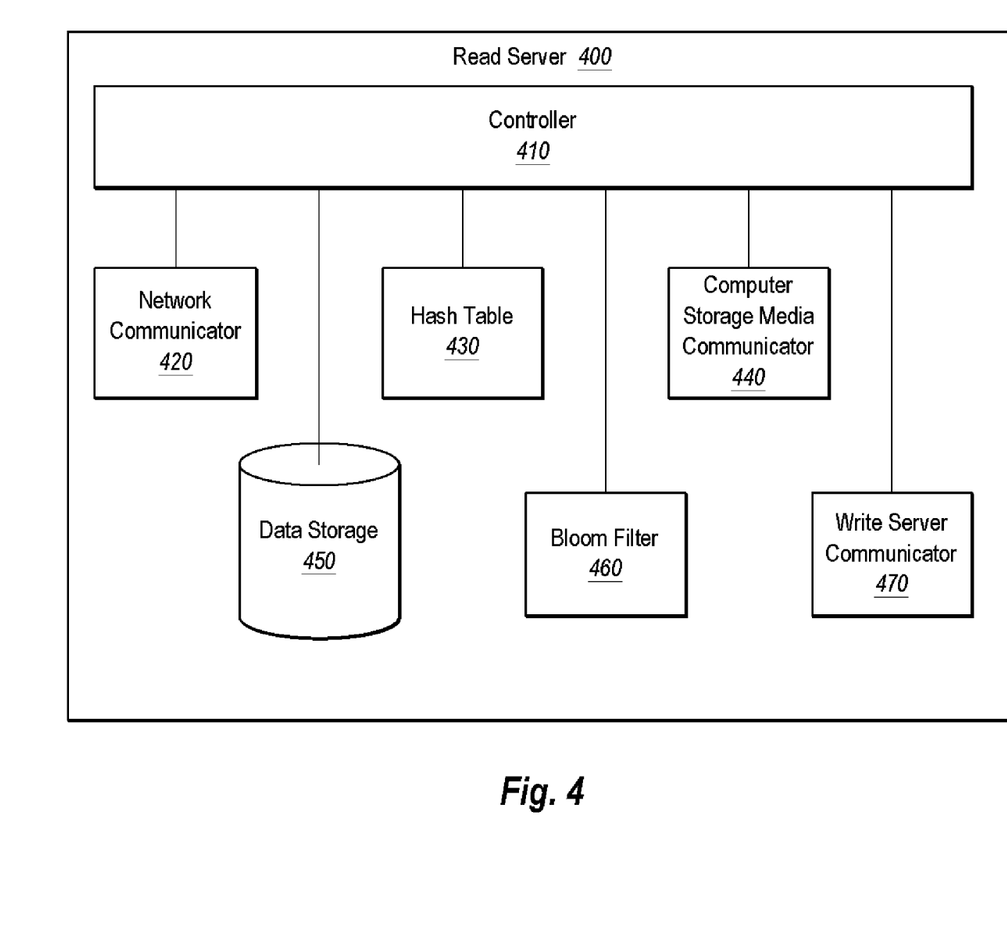
FIG. 4 is a block diagram of an example read server that may be implemented in any of the example data storage systems of FIGS. 1 and 2.

FIG. 4 is a block diagram of an example read server 400 that may be implemented in any of the example data storage systems 120, 220, 270 of FIGS. 1 and 2, arranged in accordance with at least some embodiments described herein.

As illustrated, the read server 400 may include a controller 410, a network communicator 420, a hash table 430, a computer storage media communicator 440, a data storage 450, a bloom filter 460, and a write server communicator 470. The controller 410 may be communicatively coupled with the network communicator 420, the hash table 430, the computer storage media communicator 440, the data storage 450, the bloom filter 460, and the write server communicator 470.

The read server 400 may be configured to use the controller 410, the network communicator 420, the hash table 430, the computer storage media communicator 440, the data storage 450, the bloom filter 460, and the write server communicator 470, to communicate with one or more clients and to receive and process read data requests from one or more clients.

In general, the controller 410 may be configured to control the operations of the read server 400 and to coordinate processing of read data requests with the network communicator 420, the hash table 430, the computer storage media communicator 440, the data storage 450, the bloom filter 460, and the write server communicator 470.

The write server communicator 470 may be configured to establish a communication connection with a write server and to receive data from the write server that is to be stored in the read server 400. The write server communicator 470 may send the data received from the write server to the controller 410.

The controller 410 may determine a location in the data storage 450 where the data from the write server may be stored. In some embodiments, the data may include a key-value pair. In these and other embodiments, the controller 410 may send the key of the key-value pair to the hash table 430. The hash table 430 may be configured to determine a hash value using the key that may indicate a storage location for the key-value pair and to send the hash value to the controller 410. The controller 410 may use the hash value to store the key-value pair in the data storage 450. In some embodiments, the controller 410 may receive other information from the write server along with the data that may indicate a storage location for the data. Alternately or additionally, the controller 410 may determine the storage location independent of outside information.

The read server 400 may store the data received from the write server in the data storage 450 for a duration. The controller 410 may be configured to determine the duration for storing the data in the data storage 450 based on one or more factors. The factors may include an amount of storage space in the data storage 450, an amount of available storage space in the data storage 450, a length of time the data has been stored in the data storage 450, a last access time of the data by the controller 410, a number of read data requests received at the read server 400 over a period, among others.

After the duration, the controller 410 may be configured to send the data to the computer storage media communicator 440 for storage in a computer storage media when the data has not been previously stored in the computer storage media by the write server that sent the data to the read server 400. The computer storage media communicator 440 may be configured to establish a communication connection with the computer storage media and to handle the transfer of the data and the storage of the data in the computer storage media.

The controller 410 may also be configured to erase the data from the data storage 450 after the duration to make the storage space used by the data available for other data. In some embodiments, where the data is a key-value pair, the controller 410 may also be configured to add the key of the data being erased to the bloom filter 460. The bloom filter 460 may be used to indicate key-value pairs that are stored on the computer storage media that had previously been stored in the data storage 450 of the read server 400.

The network communicator 420 may be configured to receive read data requests from one or more clients. To receive a read data request, the network communicator 420 may receive the read data request from a client and may establish a communication connection between the network communicator 420 and the client. The network communicator 420 may send the read data request to the controller 410 and receive the data requested in the read data request from the controller 410 or an indication that the data is not found by the read server 400. The network communicator 420 may also be configured to send the data or the indication that the data is not found to the client.

When a read data request is received, the controller 410 may be configured to determine if the data requested in the read data request is located in the data storage 450. When the data is located in the data storage 450, the controller 410 may access the data from the data storage 450 and may provide the data to the network communicator 420 for sending to the requesting client. When the data is not located in the data storage 450, the controller 410 may determine if the data is stored on the computer storage media.

In some embodiments, the controller 410 may query the computer storage media by way of the computer storage media communicator 440 to determine if the data is stored on the computer storage media. In some embodiments, when the data is a key-value pair, the controller 410 may query the bloom filter 460 using the key of the key-value pair to determine if the data is stored on the computer storage media. Using the bloom filter to determine if the data is stored on the computer storage media may reduce accesses to the computer storage media and thus produce faster response times for responding to a read data request than directly accessing the computer storage media. When the bloom filter 460 or the computer storage media indicates that the computer storage media includes the data, the controller 410 may access the data from the computer storage media by way of the computer storage media communicator 440 and may send the data to the network communicator 420 for sending to the requesting client. When the bloom filter 460 or the computer storage media indicates that the computer storage media does not include the data, the controller 410 may send an indication to the network communicator 420 for sending to the requesting client that the data is not found.

Figure 5:
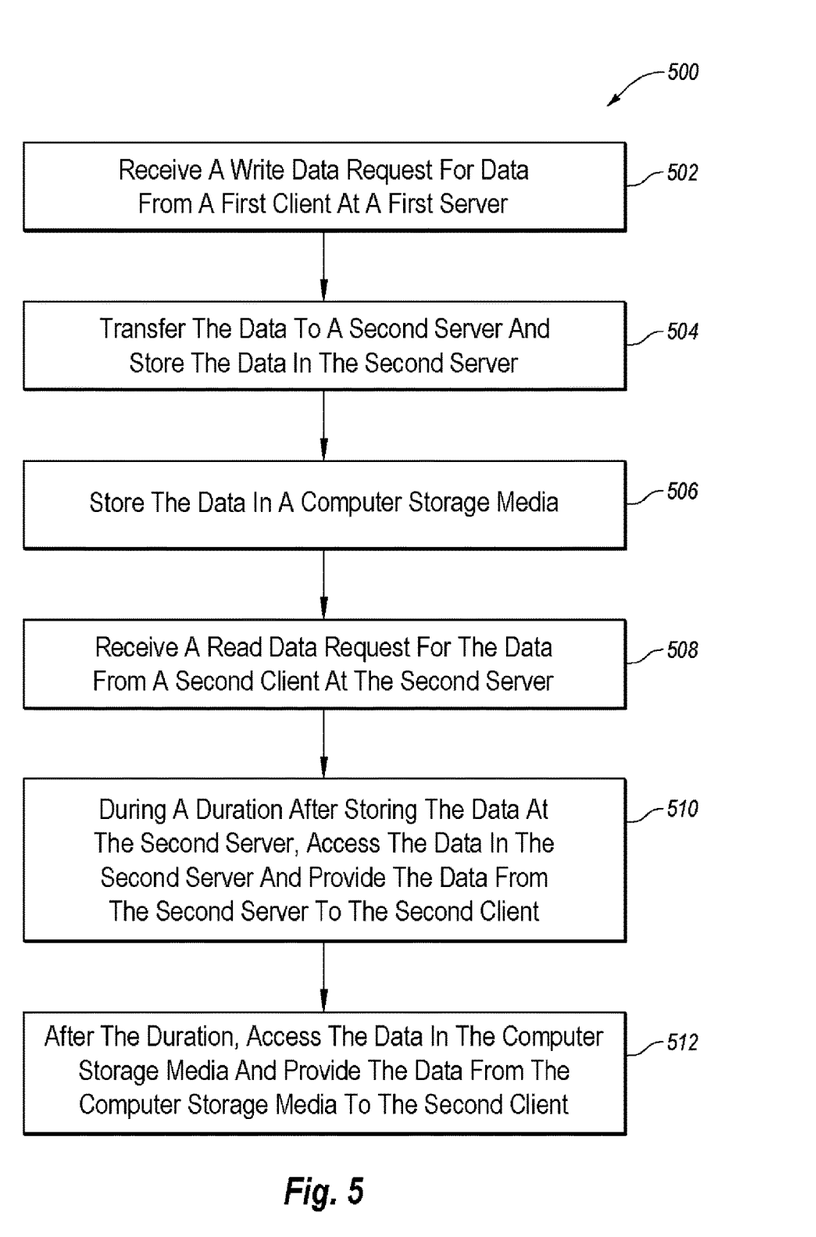
FIG. 5 illustrates an example flow diagram of a method of providing data storage.

FIG. 5 illustrates an example flow diagram of a method 500 of providing data storage, arranged in accordance with at least some embodiments described herein. The method 500 may be performed in whole or in part by, e.g., the data storage system 120 of FIG. 1 and/or one of the data storage systems 220, 270 of FIG. 2. The method 500 includes various operations, functions, or actions as illustrated by one or more of blocks 502, 504, 506, 508, 510 and/or 512. The method 500 may begin at block 502.

In block 502 [Receive A Write Data Request For Data From A First Client At A First Server], a write data request for data may be received from a first client at a first server. In some embodiments, the data may be a key-value pair. In some embodiments, the first server may receive the write data request from the first client based on a hash value calculated using the key of the data. Block 502 may be followed by block 504.

In block 504 [Transfer The Data To A Second Server And Store The Data In The Second Server], the data may be transferred to and stored in a second server. In some embodiments, the second server may be selected as the recipient of the data based on a hash value calculated using the write data request and in particular a key of a key-value pair within the write data request. In some embodiments, the first and second servers may be the same servers. In some embodiments, the second server may be a slave of the first server. Block 504 may be followed by block 506.

In block 506 [Store The Data In A Computer Storage Media], the data may be stored in a computer storage media. The computer storage media may be a disk storage, a hard disk, an optical disc, a magnetic tape, a holographic computer storage media, among other computer storage media types. The data may be indexed in the computer storage media using a B+ tree, a B tree, a tango tree, a splay tree, a treap, a red-black tree, a UB tree, an Htree, a dancing tree, or some other method. Block 506 may be followed by block 508.

In block 508 [Receive A Read Data Request For The Data From A Second Client At The Second Server], a read data request for the data may be received from a second client at the second server. In some embodiments, the second server may receive the read data request from the second client based on a hash value calculated using the key of the data. Block 508 may be followed by block 510.

In block 510 [During A Duration After Storing The Data At The Second Server, Access The Data In The Second Server And Provide The Data From The Second Server To The Second Client], during a duration after storing the data at the second server, the data may be accessed in the second server and may be provided from the second server to the second client. In some embodiments, the first client and the second client may be the same. Block 510 may be followed by block 512.

In block 512 [After The Duration, Access The Data In The Computer Storage Media And Provide The Data From The Computer Storage Media To The Second Client], after the duration, the data may be accessed in the computer storage media and may be provided from the computer storage media to the second client. In some embodiments, after the duration, the data may be deleted from the second server.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

For example, the method 500 may further include receiving the data at the computer storage media from the first server. Alternately or additionally, the method 500 may further include receiving the data at the computer storage media from the second server. In these and other embodiments, the data may be received at the computer storage media from the second server after the duration.

The method 500 may further include checking the second server for the data using a hash value calculated using the read data request. Alternately or additionally, after the duration, the method 500 may include adding the key of the key-value pair to a bloom filter and querying the bloom filter using the key before accessing the data in the computer storage media.

The method 500 may further include calculating the duration based on data storage space within the second server, a last access time of the data by the second server based on the read data request received at the second server, a number of the read data requests received at the second server over a period, or other factors.

The method 500 may further include receiving a second write data request for a second data from a third client at the first server and transferring the second data to a third server and storing the data at the third server. In some embodiments, the third server may be selected as the recipient of the second data based on a hash value calculated using the second write data request. The data may also be stored in the computer storage media.

The method 500 may further include receiving a second read data request for the second data from a fourth client at the third server. During a second duration, after storing the second data at the third server, the second data may be accessed by the third server and may be provided by the third server to the fourth client. After the duration, the second data in the computer storage media may be accessed and provided from the computer storage media to the fourth client. In these and other embodiments, the second and third servers may be configured as slaves to the first server.

Figure 6:
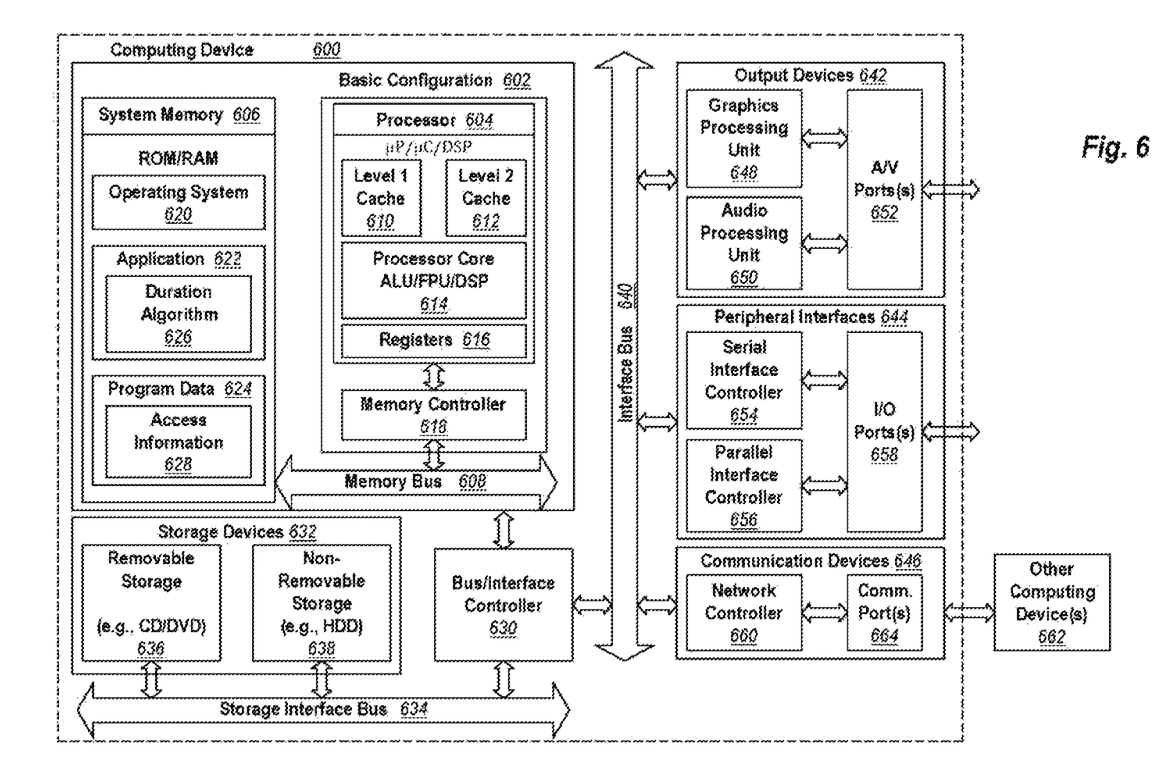
FIG. 6 is a block diagram illustrating an example computing device that may be implemented within any of the data storage systems of FIGS. 1 and 2, all arranged in accordance with at least some embodiments described herein.

FIG. 6 is a block diagram illustrating an example computing device 600 that may be implemented within any of the data storage systems 120, 220, 270 of FIGS. 1 and 2, in accordance with at least some embodiments described herein. The computing device 600 may be included in any one of the write server 130, the write server_1 230, the write server_2 280, or the write server 300 and/or the first read server 140, the second read server 142, the read server_1A 240, the read server_1B 242, the read server_2A 282, the read server_2B 284, or the read server 400 described herein, and/or the computing device 600 may include any one or more of the controller 310 and/or the controller 410 described herein among other elements described herein. In a very basic configuration 602, the computing device 600 typically includes one or more processors 604 and a system memory 606. A memory bus 608 may be used for communicating between the processor 604 and the system memory 606.

Depending on the desired configuration, the processor 604 may be of any type including but not limited to a microprocessor (µP), a microcontroller (µC), a digital signal processor (DSP), or any combination thereof. The processor 604 may include one or more levels of caching, such as a level one cache 610 and a level two cache 612, a processor core 614, and registers 616. An example processor core 614 may include an arithmetic logic unit (ALU), a floating point unit (FPU), a digital signal processing core (DSP Core), or any combination thereof. An example memory controller 618 may also be used with the processor 604, or in some implementations, the memory controller 618 may be an internal part of the processor 604.

Depending on the desired configuration, the system memory 606 may be of any type including but not limited to volatile memory (such as RAM), non-volatile memory (such as ROM, flash memory, etc.) or any combination thereof. The system memory 606 may include an operating system (OS) 620, one or more applications 622, and program data 624. For example, in some embodiments, the application 622 may include a duration algorithm 626 that may be configured to determine a duration for which data may be stored in a read server, such as the read server 400. The program data 624 may include access information 628 that may be useful for determining the duration for which the data may be stored in the read server as described herein. In some embodiments, the application 622 may be arranged to operate with the program data 624 on the OS 620 such that implementations of providing data storage such as described in the method 500 of FIG. 5 may be provided as described herein.

The computing device 600 may have additional features or functionality, and additional interfaces to facilitate communications between the basic configuration 602 and any required devices and interfaces. For example, a bus/interface controller 630 may be used to facilitate communications between the basic configuration 602 and one or more data storage devices 632 via a storage interface bus 634. The data storage devices 632 may be removable storage devices 636, non-removable storage devices 638, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 606, removable storage devices 636 and non-removable storage devices 638 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by the computing device 600. Any such computer storage media may be part of the computing device 600.

The computing device 600 may also include an interface bus 640 for facilitating communication from various interface devices (e.g., output devices 642, peripheral interfaces 644, and communication devices 646) to the basic configuration 602 via the bus/interface controller 630. Example output devices 642 include a graphics processing unit 648 and an audio processing unit 650, which may be configured to communicate to various external devices such as a display or speakers via one or more A/V ports 652. Example peripheral interfaces 644 include a serial interface controller 654 or a parallel interface controller 656, which may be configured to communicate with external devices such as input devices (e.g., keyboard, mouse, pen, voice input device, touch input device, etc.) or other peripheral devices (e.g., printer, scanner, etc.) via one or more I/O ports 658. An example communication device 646 includes a network controller 660, which may be arranged to facilitate communications with one or more other computing devices 662 over a network communication link via one or more communication ports 664.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 600 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 600 may also be implemented as a personal computer including both laptop computer and non-laptop computer configurations.

The present disclosure is not to be limited in terms of the particular embodiments described herein, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that the present disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible sub ranges and combinations of sub ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into sub ranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

The invention claimed is:

1. A system configured to provide data storage, the system comprising:
a write server configured to receive data, from a first client, to be stored on the system;
a computer storage medium configured to receive and to store the data; and
a read server separate from the write server, the read server configured to:
receive the data from the write server,
store the data received from the write server in the read server for a particular duration,
receive a read data request from a second client for the data stored in the read server,
in response to the read data request being received during the particular duration for which the data is stored in the read server, provide the data from the read server to the second client, and
in response to the read data request being received after the particular duration for which the data is stored in the read server, access the data from the computer storage medium and provide the data accessed from the computer storage medium to the second client.

2. The system of claim 1, wherein the first client and the second client are same.

3. The system of claim 1, wherein:
the computer storage medium is configured to receive the data from one or more of the write server and the read server,
the computer storage medium includes a non-volatile computer storage medium, and
the data is indexed in the computer storage medium according to one or more of a B+ tree, a B tree, a tango tree, a splay tree, a treap, a red-black tree, a UB tree, an Htree, or a dancing tree.

4. The system of claim 1, wherein the particular duration is variable and based on one or more of: data storage space within the read server, a last access time of the data by the read server, and a number of read data requests received at the read server over a period.

5. The system of claim 1, wherein the read server includes a first read server, the data includes first data, the read data request includes a first read data request, and the particular duration includes a first particular duration, the system further comprising a second read server configured to:
   receive second data from the write server and store the second data in the second read server for a second particular duration;
   receive a second read data request from a third client for the second data;
   in response to the second read data request being received during the second particular duration, provide the second data from the second read server to the third client; and
   in response to the second read data request being received after the second particular duration, access the second data from the computer storage medium and provide the second data accessed from the computer storage medium to the third client.

6. The system of claim 5, wherein:
   the second data includes a key-value pair, and
   the second read data request is sent to the second read server based on a hash value of a key contained within the second data.

7. The system of claim 5, wherein one or more of the first read server and the second read server are configured as slaves to the write server.

8. The system of claim 5, wherein:
   the second data includes a key-value pair, and
   the write server is configured to select the second read server as a recipient of the second data based on a hash value calculated based on a key included in the key-value pair of the second data.

9. The system of claim 5, wherein the second read server is further configured to:
   receive a third read data request from the second client for the second data;
   in response to the third read data request being received during the second particular duration, provide the second data from the second read server to the second client; and
   in response to the third read data request being received after the second particular duration, access the second data from the computer storage medium and provide the second data accessed from the computer storage medium to the second client.

10. A system configured to provide data storage, the system comprising:
    a write server configured to receive data, from a first client, to be stored on the system, wherein the data includes a key-value pair;
    a computer storage medium configured to receive and to store the data; and
    a read server separate from the write server, the read server configured to:
       receive the data from the write server,
       store the data in the read server for a particular duration,
       receive a read data request from a second client for the data,
       in response to the read data request being received during the particular duration, provide the data from the read server to the second client, and
       in response to the read data request being received after the particular duration:
          send the data to the computer storage medium;
          delete the data from the read server;
          add a key of the data to a bloom filter after the data is deleted;
          query the bloom filter before the data is accessed from the computer storage medium; and
          access the data from the computer storage medium and provide the data accessed from the computer storage medium to the second client.

11. The system of claim 10, wherein the write server is configured to receive the data from the first client based on a hash value of the key of the data.

12. A method of data storage, the method comprising:
    receiving, at a first server and from a first client, a write data request for data;
    transferring the data from the first server to a second server, the second server is separate from the first server;
    storing the data received from the first server in the second server for a particular duration;
    after the particular duration, storing the data in a computer storage medium;
    receiving, at the second server and from a second client, a read data request for the data stored in the second server;
    in response to the read data request being received during the particular duration for which the data is stored in the second server, accessing, by the second server, the data in the second server and providing the data from the second server to the second client; and
    in response to the read data request being received after the particular duration for which the data is stored in the second server, accessing, by the second server, the data stored in the computer storage medium and providing the data from the computer storage medium to the second client.

13. The method of claim 12, further comprising receiving the data at the computer storage medium from one or more of the first server and the second server.

14. The method of claim 12, further comprising calculating the particular duration based on one or more of: data storage space within the second server, a last access time of the data by the second server, and a number of the read data requests received at the second server over a period.

15. The method of claim 12, wherein the data includes a key-value pair.

16. The method of claim 15, further comprising after the particular duration:
    deleting the data from the second server;
    adding a key of the key-value pair to a bloom filter; and
    querying the bloom filter using the key prior to accessing the data in the computer storage medium.

17. The method of claim 15, wherein receiving, at the first server and from the first client, the write data request includes receiving the write data request from the first client based on a hash value calculated using a key included in the key-value pair of the data.

18. The method of claim 15, wherein receiving, at the second server and from the second client, the read data request includes receiving the read data request from the second client based on a hash value calculated using a key included in the key-value pair of the data.

19. The method of claim 12, further comprising in response to the read data request being received during and/or after the particular duration, checking the second server for the data using a hash value calculated using the read data request.

20. The method of claim 12, wherein the write data request includes a first write data request, the data includes first data, the particular duration includes a first particular duration, and the read data request includes a first read data request, the method further comprising:
- receiving, at the first server, a second write data request for second data from a third client;
- transferring the second data from the first server to a third server and storing the second data at the third server for a second particular duration;
- after the second particular duration, storing the second data in the computer storage medium;
- receiving, at the third server, a second read data request for the second data from a fourth client;
- in response to the second read data request being received during the second particular duration, accessing the second data in the third server and providing the second data from the third server to the fourth client; and
- in response to the second read data request being received after the second particular duration, accessing the second data stored in the computer storage medium and providing the second data from the computer storage medium to the fourth client.

21. The method of claim 20, wherein one or more of the second server and the third server are configured as slaves to the first server.

22. The method of claim 20, further comprising selecting the third server as a recipient of the second data based on a hash value calculated using the second write data request.

23. A method of data storage, the method comprising:
- receiving, by a write server and from a first client, data to be stored on a system, wherein the data includes a key-value pair;
- storing the data in a computer storage medium coupled to the write server;
- receiving, by a read server coupled to the computer storage medium and to the write server, the data from the write server;
- storing the data in the read server for a particular duration;
- receiving, by the read server, a read data request from a second client for the data,
- in response to the read data request being received during the particular duration, providing the data from the read server to the second client; and
- in response to the read data request being received after the particular duration:
  - sending, by the read server, the data to the computer storage medium;
  - deleting the data from the read server;
  - adding a key of the data to a filter after the data is deleted;
  - querying the filter before the data is accessed from the computer storage medium; and
  - accessing the data from the computer storage medium so as to provide the data accessed from the computer storage medium to the second client.

24. The method of claim 23, wherein querying the filter includes querying a Bloom filter.

* * * * *

UNITED STATES PATENT AND TRADEMARK OFFICE
CERTIFICATE OF CORRECTION

| | |
|---|---|
| PATENT NO. | : 9,684,672 B2 |
| APPLICATION NO. | : 14/358770 |
| DATED | : June 20, 2017 |
| INVENTOR(S) | : Zhang et al. |

It is certified that error appears in the above-identified patent and that said Letters Patent is hereby corrected as shown below:

In the Specification

In Column 2, Line 30, delete "hereof In" and insert -- hereof. In --, therefor.

Signed and Sealed this
Nineteenth Day of September, 2017

Joseph Matal
*Performing the Functions and Duties of the*
*Under Secretary of Commerce for Intellectual Property and*
*Director of the United States Patent and Trademark Office*